UNITED STATES PATENT OFFICE.

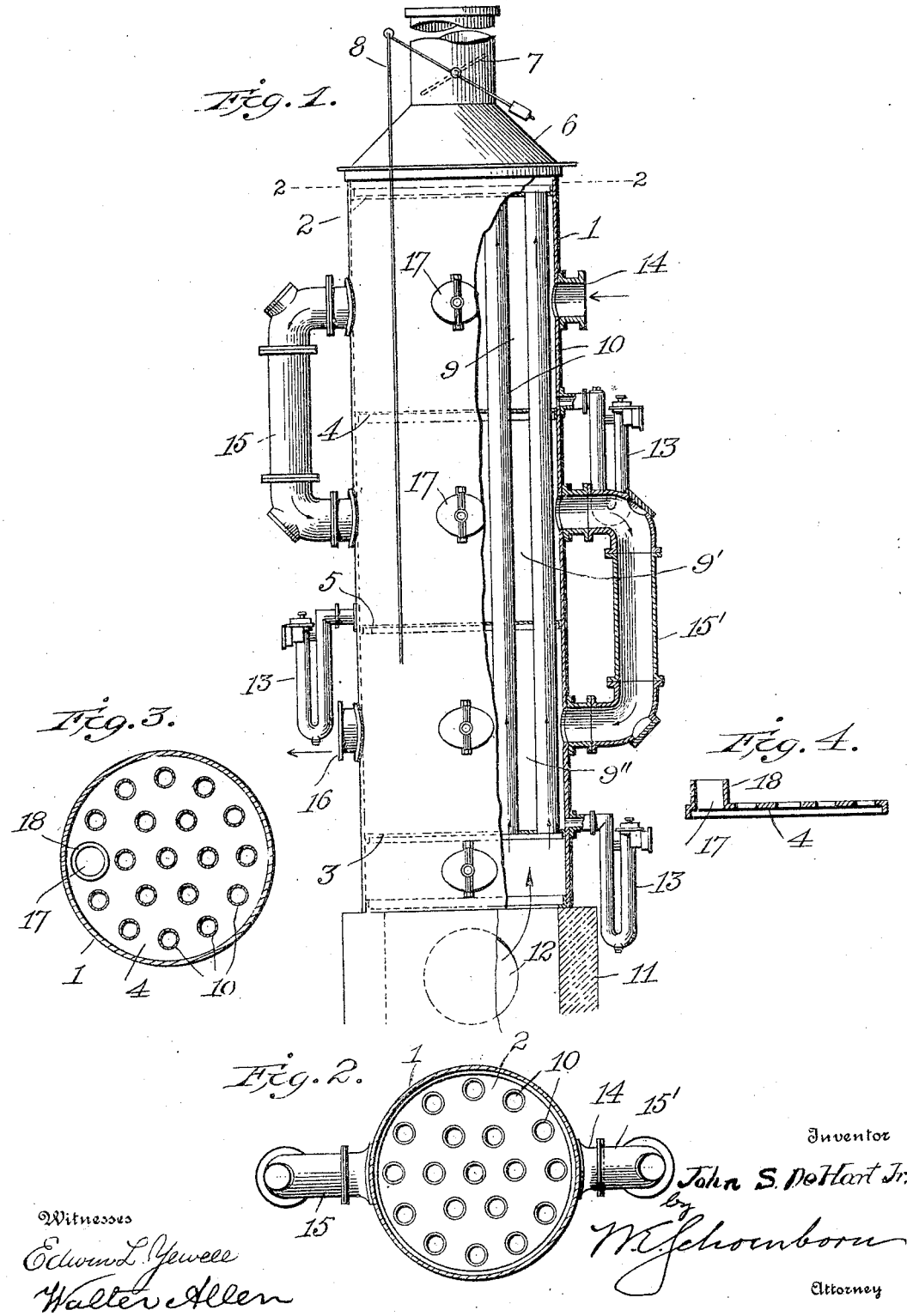

JOHN S. DE HART, JR., OF EAST ORANGE, NEW JERSEY, ASSIGNOR TO ISBELL-PORTER COMPANY, OF NEWARK, NEW JERSEY, A CORPORATION OF NEW YORK.

GAS-CONDENSER.

No. 803,154.  Specification of Letters Patent.  Patented Oct. 31, 1905.

Application filed December 21, 1904. Serial No. 237,813.

*To all whom it may concern:*

Be it known that I, JOHN S. DE HART, Jr., a citizen of the United States, residing at East Orange, in the county of Essex and State of New Jersey, have invented certain new and useful Improvements in Gas-Condensers, of which the following is a specification.

The invention relates to a gas-condenser, preferably of the air-cooling type; and the object of the invention is to increase the efficiency of the condenser by preventing the coating of the cooling-surface with the condensed impurities from the gas and at the same time simplify the construction. This object is attained by means of the construction shown in the accompanying drawings, showing one embodiment of my invention, and the novel features thereof are 1 scribed in the subjoined specification and particularly pointed out in the appended claims.

Figure 1 is a side elevation, partly in section, of the condenser. Fig. 2 is a horizontal section thereof on the line 2 2 of Fig. 1. Fig. 3 is a plan view of a modified form of the diaphragms separating the condensing-chambers when no roundabouts are used, and Fig. 4 is a section of the diaphragm shown in Fig. 3.

Referring to Figs. 1 and 2 of the drawings in detail, in which similar reference characters indicate the same parts in the several views, the condenser consists of a cylindrical or other shaped body 1, provided near its opposite ends with the heads 2 and 3, and intermediate its ends with heads or diaphragms 4 and 5 and at its top with a stack 6, damper 7, and rod 8 for controlling the same. The diaphragms 4 and 5 divide the condenser into a plurality of compartments or chambers 9, 9', and 9'', through which pass the cooling-flues, consisting, preferably, of continuous tubes 10, secured to the heads 2 and 3 and the diaphragms 4 and 5. The whole rests on a suitable base or foundation 11, having an opening 12 for the admission of a blast of air or other cooling medium. At the bottom of each chamber there is located a drip 13 of usual construction, having a water seal to prevent the gas blowing out and to provide a constant outlet for the condensed impurities. The inlet for the gas is indicated at 14 and the outlet at 16. 15 and 15' indicate suitable roundabouts for conveying the gas from one chamber to another, said roundabouts connecting the chambers substantially midway their ends. In other words, the gas is made to enter and leave each chamber about midway the upper and lower ends thereof. 17 17 are openings provided with the usual covers and securing means, which are removed for the inspection of the interior of compartments 9 9' 9''.

In air-condensers of the usual construction the gas to be purified is made to enter at the top of the chamber and to leave at the bottom thereof, which results in the cooling-surface being coated with tar or other condensed impurities, thus materially affecting the efficiency of the condenser. By providing a plurality of chambers and means connected with each for carrying away the condensed impurities such impurities are drawn off at two or more points in the downward passage of the gas, thus preventing accumulations of the same on the cooling-surface and increasing the efficiency. Also by locating the inlets and outlets for the gas to be purified at some distance from the bottom of the chamber, where the tar and other impurities collect, the gas is forced into contact with the cooling-surface at points not coated with such impurities, by which means also the efficiency of the condenser is increased.

It is not necessary to locate the inlets and outlets at any particular point, it being necessary only that they should be so located as to compel the gas to pass over those parts of the cooling-surface of the flues or tubes as are not coated with impurities. Therefore the terms "midway" and "above" used in the claims referring to the location of the inlets and outlets relative to the drips and bottoms of the chambers are only relative and are not intended to limit the construction to any particular location except as it is necessary to carry out the function above stated.

In the use of the apparatus the gas to be purified is admitted at the inlet 14 and passes around the cooling-flues 10 in the chamber 9, thence through the roundabout 15 into chamber 9', through roundabout 15' to chamber 9'' and outlet 16. The cooling medium is passed through the opening 12 into the cooling flues or tubes 10 and through the stack 6, being regulated in its passage by the damper 7 through the rod 8.

Instead of the roundabouts 15 and 15', as indicated in Figs. 1 and 2, for connecting the condensing chambers or compartments 9, 9', or 9'' I may omit the same and construct each of the heads or diaphragms 4 and 5 with a suitable opening 17, which may be provided with an upturned edge or flange 18, whose upper edge is sufficiently above the outlet of the drip 13 in each of the condensing-compartments so as to allow the gas to pass readily from one compartment to the other and at the same time prevent the condensed impurities accumulated at the bottom of one compartment passing to the one below.

It is to be understood that the cooling may be effected by any suitable means as well as by the means I have described.

It will be obvious that my invention is not limited to the specific structure by which I have illustrated the same, but that the details may be varied extensively without departing from the spirit thereof.

What I claim, and desire to secure by Letters Patent, is—

1. A gas-condenser comprising a plurality of superposed gas-chambers, vertical cooling-tubes in each of said chambers forming continuous and unbroken cooling-passages through the condenser, roundabouts connecting one chamber with another, each chamber being provided with means for carrying away the accumulated impurities.

2. A gas-condenser comprising a plurality of superposed gas-chambers, vertical cooling-tubes in each of said chambers forming continuous and unbroken cooling-passages through the condenser, each gas-chamber being provided with a drip and a gas-roundabout connecting the adjacent chambers.

3. A gas-condenser comprising a plurality of superposed gas-chambers and vertical cooling-flues common to said chambers, each chamber being provided with a drip and a gas-roundabout.

4. A gas-condenser comprising a hollow body, heads closing the ends thereof, one or more diaphragms intermediate the heads and separated from the heads and from each other to form separate gas-chambers, continuous cooling-flues passing through the gas-chambers, a drip at the bottom of each chamber, and inlets and outlets for the gas located above the respective drips.

5. A gas-condenser comprising a plurality of superposed gas-chambers, drips at the bottoms of each chamber, vertical cooling-flues passing through the chambers, an inlet located above the drips, and roundabouts conducting the gas from one chamber to another, said roundabouts having connections with the chambers located above the respective drips.

In testimony whereof I affix my signature in presence of two witnesses.

JOHN S. DE HART, Jr.

Witnesses:
J. H. OSBORNE,
R. K. WEHNER.